United States Patent [19]

Pedersen et al.

[11] Patent Number: 4,508,262

[45] Date of Patent: Apr. 2, 1985

[54] THERMOSTAT ATTACHMENT FOR A VALVE

[75] Inventors: Svend P. Pedersen; Jens J. Mølbaek; Allan H. Hansen, all of Nordborg, Denmark

[73] Assignee: Danfoss A/S, Nordborg, Denmark

[21] Appl. No.: 531,412

[22] Filed: Sep. 12, 1983

[30] Foreign Application Priority Data

Oct. 1, 1982 [DE] Fed. Rep. of Germany ....... 3236372

[51] Int. Cl.³ .............................................. F24F 11/06
[52] U.S. Cl. ..................................... 236/42; 236/99 R
[58] Field of Search .......................... 236/42, 86, 99 R; 374/198, 201, 204

[56] References Cited

U.S. PATENT DOCUMENTS

| 2,045,332 | 6/1936 | Otto | 236/42 X |
| 3,735,776 | 5/1973 | Graversen et al. | 236/42 X |
| 4,290,553 | 9/1981 | Molgaard et al. | 236/42 |

FOREIGN PATENT DOCUMENTS

| 2220340 | 11/1973 | Fed. Rep. of Germany | 236/42 |
| 2613991 | 3/1977 | Fed. Rep. of Germany | 236/42 |

*Primary Examiner*—William E. Tapolcai
*Attorney, Agent, or Firm*—Wayne B. Easton

[57] ABSTRACT

The invention relates to a thermostatic valve assembly of the type in which the working element containing the vapor-liquid filling is housed in the temperature setting control knob. A threaded adjusting connection between the knob and an axially moveable unit which controls the compression of the setting spring provides rugged and simple construction.

12 Claims, 5 Drawing Figures

THERMOSTAT ATTACHMENT FOR A VALVE

The invention relates to a thermostat attachment for a valve comprising a base, an axially retained knob, a working element which is fixed with respect to the base and has a stiff capsule of which the end face frictionally engages the end wall of the knob and a movable plate which is connected to a stem-like setting element and which is subjected to the vapour pressure inside the working element and in the opposite direction to a desired value spring, and a supporting bearing for the desired value spring, which bearing is axially displaceable but non-rotatable at the base and is axially adjustable by turning an internal screw thread connected to the knob relatively to an external non-rotatable screw thread which is connected to the supporting bearing.

In a known thermostat attachment (DEPS No. 2921522), the base has a plurality of axially parallel projections which project into the hollow knob and at the free ends of which the capsule of the working element is axially and rotationally fixed with the aid of securing elements. The supporting bearing has arms which pass between the base projections and thereby prevent rotation and which carry ribs of the external screw thread at the outer end. The external screw thread engages the internal screw thread which is provided directly on the inner periphery of the knob. The end wall of the knob is frictionally pushed against the end wall of the capsule fixed with respect to the base because the knob is loaded by the desired value spring by way of the supporting bearing and the screw thread. In this way, the knob is retained axially.

In this construction, all the forces acting on the knob are diverted to the projections of the base by way of the capsule and the securing elements. In the case of heavy loads, this can lead to over stressing at the securing point. In addition, the capsule of the working element has to be provided with special lugs or the like which can be engaged by the securing elements. During assembly, securing of the working element to the projections of the base with the aid of screws or rivets can prove a difficult operation which is unmanageable without manual manipulation.

The invention is based on the problem of providing a thermostat attachment of the aforementioned kind which has a simple construction and greater strength and is particularly suitable for fully automatic assembly.

This problem is solved according to the invention in that the knob is rotatably mounted at the base but axially fixed, and that the movable plate of the working element is axially displaceably but non-rotatably connected to the supporting bearing.

In this construction, a higher strength is obtained because forces acting on the knob are transmitted directly to the base and the force transmitting area can be designed to be much larger than in the known attachment between the capsule of the working element and the base. The direct securing of the working element to the base is dispensed with. One does therefore not require the appropriate securing elements and no lugs or the like on the capsule. Nevertheless, the working element is held stationary with respect to the base. This is because it is secured against rotation with the aid of the supporting bearing and it has an axially fixed position because it is frictionally pressed by the desired value spring against the end wall of the knob. The omission of securing elements also simplifies assembly. The steps required to apply the knob to the base can be readily automated.

In a thermostat attachment where the working element comprises a corrugated tube connected near the end of the capsule to the plate and at the other end by way of a flange to the outer peripheral wall of the capsule, it is advisable for the internal screw thread and the external screw thread to have a smaller diameter than the internal diameter of the corrugated tube, for the internal screw thread to be connected to rotate with the knob by way of an axially retained coupling element between the base and working element, and for the base to have a central axial guide engaging the periphery of the supporting bearing. By reason of the fact that the coupling element performs no axial movement, the capsule can be applied relatively closely to the rotational bearing of the base which receives the knob, this permitting an axially short constructional length for the knob. Nevertheless, the supporting bearing possesses sufficient axial displaceability because for this purpose there is available the space within the corrugated tube on the one hand and the axial guide in the base on the other hand.

If the capsule has an inner peripheral wall to limit the stroke of the movable plate, a guide cylinder having an axial guide may be secured to the working element by placing over retaining elements carried by the inner peripheral wall. This is a very simple possibility for securing the working element against rotation despite the axial displaceability of the supporting bearing. The guide cylinder also permits sintering of the supporting bearing and the parts connected thereto.

With particular advantage, the supporting bearing comprises a tube to the outside of which ribs of the external screw thread are applied and which comprises first guide tracks formed by longitudinal depressions open to one end wall for engaging longitudinal ribs of the axial guide of the base and second guide tracks formed by longitudinal depressions open to the other end for engaging longitudinal ribs of an axial guide connected to the movable plate. Since only the ribs of the screw thread project outwardly, there is no interference between the internal screw thread and the guide tracks. Since the guide tracks are open towards the ends, assembly with the associated longitudinal ribs of the axial guide becomes simple.

It is also advantageous for the tube to comprise a plurality of axially through going longitudinal slots to form the first and second guide tracks, or the tube portions separated by the slots to be connected to the end of the second guide track by a respective rib of the external screw thread and interconnected by an internal supporting ring, and for the longitudinal ribs to engage the first guide track from the outside and the second guide track from the inside. The through going longitudinal slots permit particularly simple production, for example, by plastics injection moulding. Utilization of the slots from the inside and outside ensures that the longitudinal ribs engaging in the first guide track will not interfere with the supporting ring and the longitudinal ribs engaging in the second guide track will not interfere with the ribs of the screw thread.

In a preferred embodiment, the axial guide of the base is formed by ribs at the inner end of radial walls connecting a ring at the securing end of the base to a mounting ring at the knob end. Such a base has, by reason of the radial walls, a very high strength so that the forces transmitted by the knob to the mounting ring of the base can be transmitted to the securing end without any problem. On the other side, the radial walls form a thermal barrier which prevents the flow of heat from the valve housing to the working element. This is because the cross-section of the material is small and the surface of the radial walls from which heat can be radiated is large. Particularly when the bases are plastics, which is poorly heat conductive, one obtains a very high dependence of the temperatures of the working element on the temperature of the valve housing.

In another construction, the internal screw thread is formed on a screw threaded tube projecting into a space surrounded by the corrugated tube. Within the scope of the given dimensions for the external screw thread, one thereby has such a large axial path available that all the conditions met in practice can be met.

In a particularly simple embodiment, the screw threaded tube is made in one piece with the coupling element and is particularly made of plastics.

In an alternative, the screw threaded tube and coupling element are interconnected against relative rotation by formations and are frictionally superposed with their end faces. This frictional connection is again brought about by the force of the desired value spring.

Preferably, the base has a circumferential edge and the knob resilient tongues each with two detent lugs which, when placing the knob over the base, receive the edge between each other. In this way one obtains between the knob and base a large bearing face over which large transverse forces can be transmitted. In addition, one can carry out automatic assembly in which, by axially pushing the knob over the base, all the other parts are also securely held together.

It is favourable for the coupling element to have projections at the periphery, which, for connection against relative rotation, engage between a respective two tongues, and has an end face with which it frictionally lies on an axially fixed member. The frictional engagement is effected by the force of the desired value spring. For assembly purposes, the coupling element and knob need merely be pushed axially into each other.

Further, the base may have an axially projecting edge guiding a radially set back peripheral wall of the coupling element. This provides centering of the coupling element and, in conjunction with the knob, an even more secure mounting of the rotatable arrangement on the base.

Further, a securing ring may be pushed over the tongues to block their resilience. When the securing ring is applied, the tongues are no longer resilient and the knob is absolutely securely seated on the base.

Alternatively, or in addition, the securing ring may serve to cover the tongues. This results in an optically uniform appearance.

In a further construction, when using a working element with a led out capillary tube, the coupling element has a circuler slot which extends through an angle of more than 180° but less than 360° and has an aperture towards the outer periphery. When turning the knob, the capillary tube passing through the slot is therefore unaffected.

The coupling element may in this case be of plastics. However, if it is of metal, one can achieve adequate stability despite the large annular gap and the external aperture and despite small dimensions.

Improved security is achieved if, for locating the capillary tube, an axial slot in the base has a spacing from the base access equal to the radius of the circular slot. The capillary tube is therefore adequately secured where it leaves the base.

If the axial slot passes through a radial wall, the capillary tube can be held over a certain length in the manner described.

The invention will now be described in more detail with reference to preferred examples illustrated in the drawing wherein.

Figure 1:
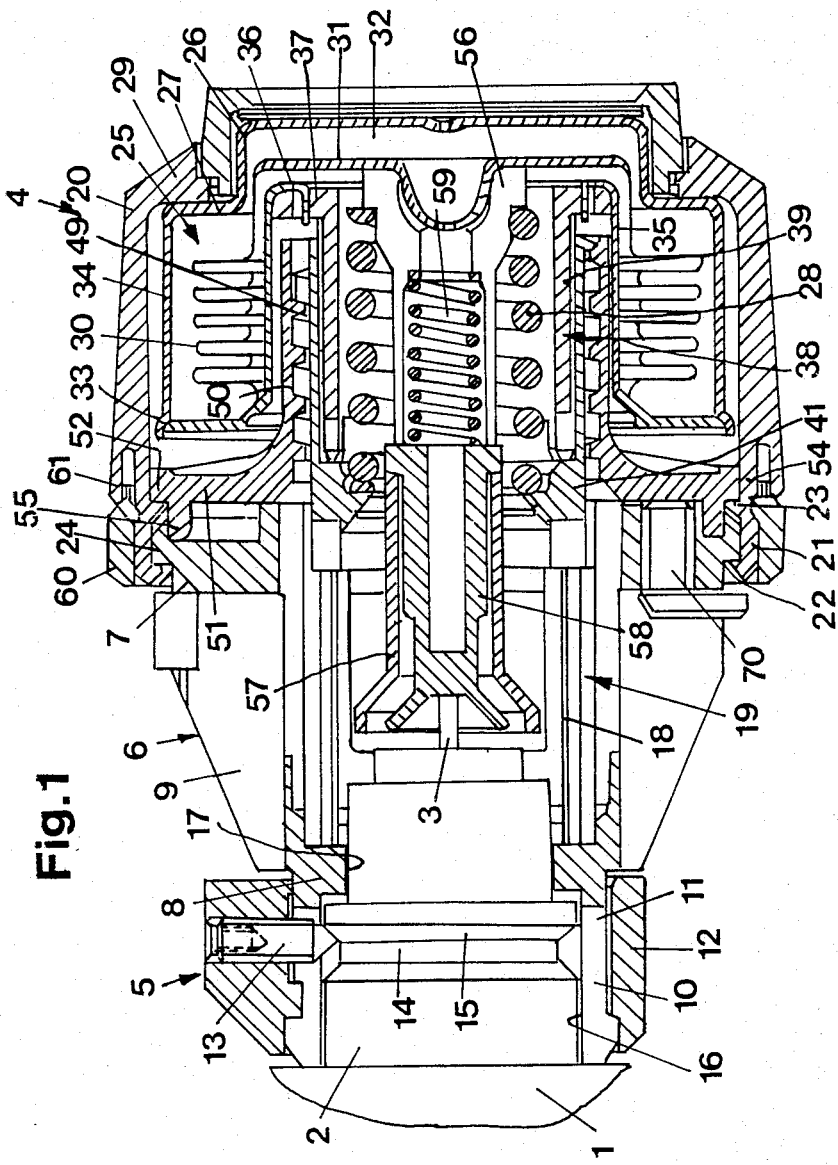
FIG. 1 is a longitudinal section through a first embodiment of a thermostat attachment according to the invention.
Figure 2:
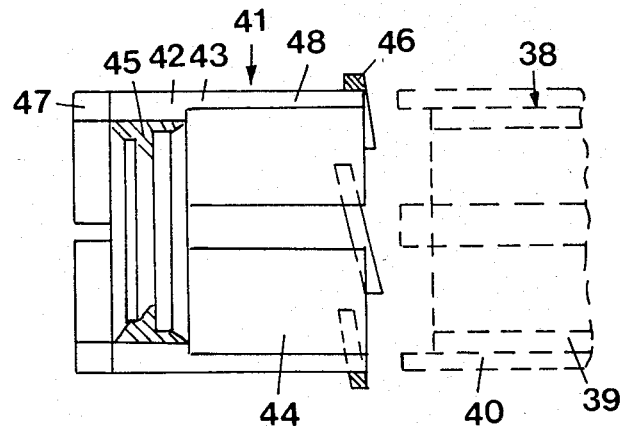
FIG. 2 is a longitudinal section through the supporting bearing of FIG. 1.

In the example of FIGS. 1 and 2, a valve housing 1 has a projection 2 which surrounds the valve stem, and a seal for loading out a pin 3 for actuating the valve stem. A thermostat attachment 4 is applied to this projection by means of securing apparatus 3.

The thermostat attachment 4 comprises a base 6 in which a mounting ring 7 is connected to a connecting ring 6 by way of radial walls 9 spaced at 45°. The connecting ring 8 has four foot sections 10 separated by axial slots 11 open to the end, thereby imparting a certain resilience. A ring 12 tends to push the foot sections 10 against the valve housing 1 when a sleeve screw 13 is turned into an annular groove 14 with an oblique wall 15. The base lies on the projection 2 with a first bearing surface 16 and an axially offset second bearing surface 17. At the end of a few radial walls 9, there are longitudinal ribs 18 of an axial guide 19 of the base.

The thermostat attachment 4 has a knob 20 provided at the periphery with six resilient tongues 21, each comprising two detent lugs 22 or 23 and snapped onto the base 6 simply by pushing over an edge 24 of the mounting ring 7. The knob is then axially retained but is rotatable. A working element 25 with a liquid vapour filling comprises a capsule 26 of which the end face 27 lies frictionally against an end wall 29 of the knob 20 under the influence of a desired value spring 28. A corrugated tube 30 is connected on the one side to a movable plate 31 which assumes positions of equilibrium under the influence of the vapour pressure in the interior 32 of the working element 25 and the opposite force of the desired value spring 28 and, on the other side, to a flange 33 which is unified with the outer peripheral wall 34 of capsule 26. The flange merges into an inner peripheral wall 35 which, together with an end flange 36, forms a stroke limiting abutment for the plate 31. Pushed onto retaining means 37 in the form of lugs on this flange 36, there is an insert 38 comprising a guide cylinder 39 and four longitudinal ribs 40 applied from the outside for the purpose of axial guiding, as is shown in FIG. 2.

A supporting bearing 41 consists of a tube 42 (FIG. 2) having four through going longitudinal slots 43. The remaining tube sections 44 are interconnected by a supporting ring 45 on which the desired value spring 28 is supported and by four ribs of an external screw thread 46. At one end, the longitudinal slots 43 form a first guide track 47 for engaging the longitudinal ribs 18 of the axial guide 19 of the base and at the other end a second guide track 48 for engaging the longitudinal ribs 40 of insert 38. The external screw thread 46 engages an internal screw thread 49 or a screw threaded tube 50 which is connected to the knob 20 by way of coupling element 51. Under the influence of the desired value spring 26, the coupling element frictionally lies with its end face 52 against the detent lugs 25 of the axially retained knob 20 so that the internal screw thread is axially retained. At the circumference of the coupling element 51 there are projections 54 (also see FIG. 4) each engaging between the tongues 21 of knob 20. The coupling element is therefore fixed against rotation relatively to this knob 20. The edge 24 projects axially and surrounds a radially set back peripheral wall 55 of the coupling element whereby the entire arrangement is additionally centered.

The desired value spring 26 also presses a stem 56 against the movable plate 31 so that it follows the movement of the plate 31. Inserted in the front end 57 of the stem there is a second stem 58 which so cooperates with a securing spring 59 that, during normal operation, movement of stem 56 is transmitted by stem 58 to the pin 3 but, when movement takes place beyond the closing position of the valve, the stem 58 is displaced relatively to the stem 56.

A securing ring 60 embraces the resilient tongues 21 and hides them from the outside. The resilient property of the tongues 21 is blocked by projection 61.

In this construction, the knob 20 is retained at the base 7. All the forces acting on it can therefore be diverted directly to the base 7. The working element 25 is only loosely inserted in the knob. The axial position is secured in that it is held by the desired value spring against the end wall 29 of knob 20. Rotation is impossible because the supporting bearing 41 is held against rotation relatively to the base by the longitudinal ribs 18 and because the working element is held against rotation relatively to the supporting bearing 41 by means of the longitudinal ribs 40. The reaction force of the desired value spring is transmitted to the base 7 by way of the supporting bearing, the external screw thread 46, the internal screw thread 49 and the coupling element 51. A very compact construction with high strength is achieved.

Assembly can be fully automatic because all the parts can be assembled by pushing them into one another axially and they are then held together by pushing the knob 20 over the base 7.

Figure 3:
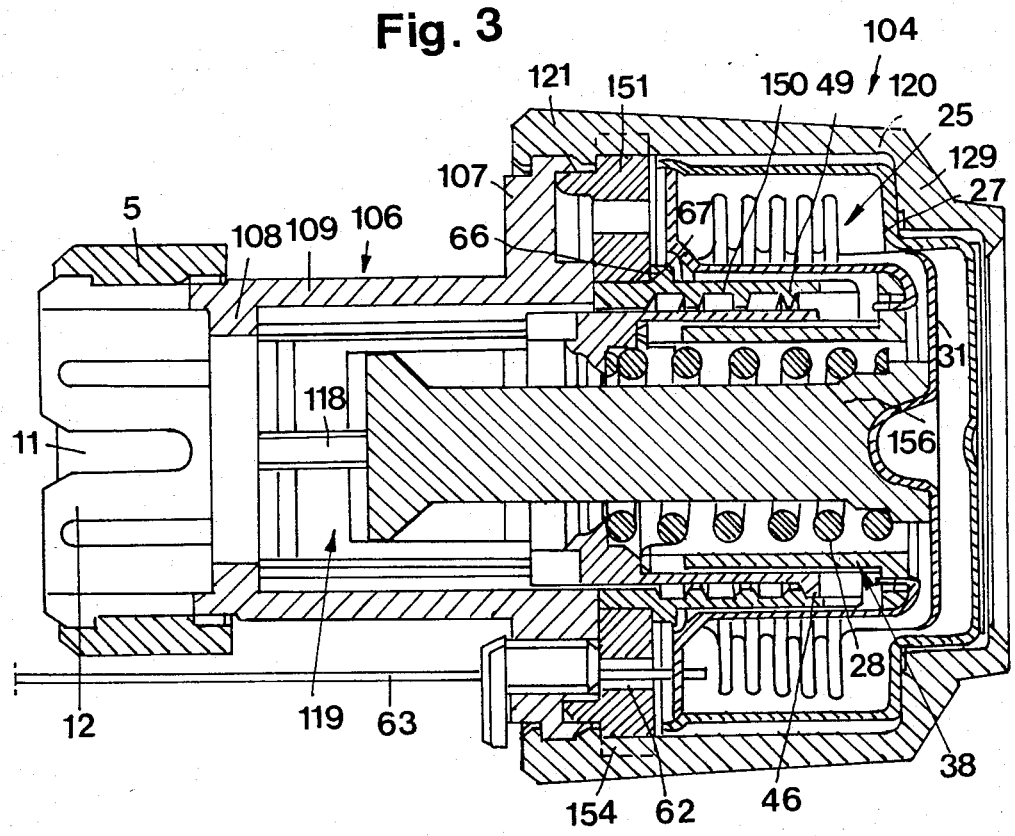
FIG. 3 is a longitudinal section through a second embodiment.
Figure 4:
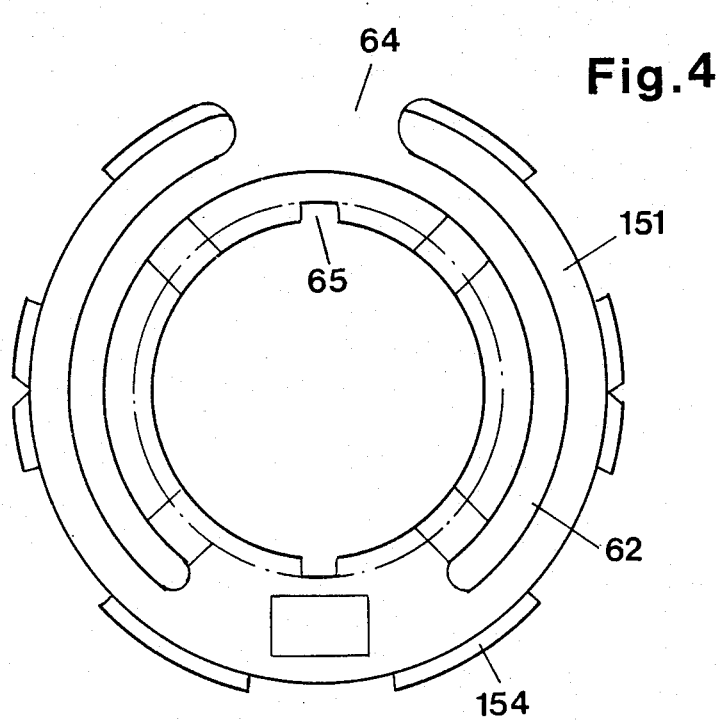
FIG. 4 is a plan view of the FIG. 3 coupling element.

In FIG. 3, the same reference numerals are used for the same parts and reference numerals increase by 100 for corresponding parts. The main difference is that the base 106 between the connecting ring 108 and mounting ring 107 has the form of a cylinder 109 provided on the inside with guide ribs 118 of an axial guide 119, and that the screw threaded tube 150 carrying the internal screw thread 49 and the coupling element 151 are two separate parts. The coupling element has an annular gap 62 through which a fixed capillary tube 63 of a working element passes. The capillary tube serves, for example, for connecting a remote sensor. As shown in FIG. 4 the circular slot 62 extends over an angle of about 300°. The coupling element 151 is of metal, preferably an injection moulding. The rotationally fixed connection between the two parts is effected by formations 65 on the coupling element 151 and corresponding formations on the screw threaded tube 100. Axial coupling is frictional at the end faces 66 and 67 of the two parts.

Figure 5:
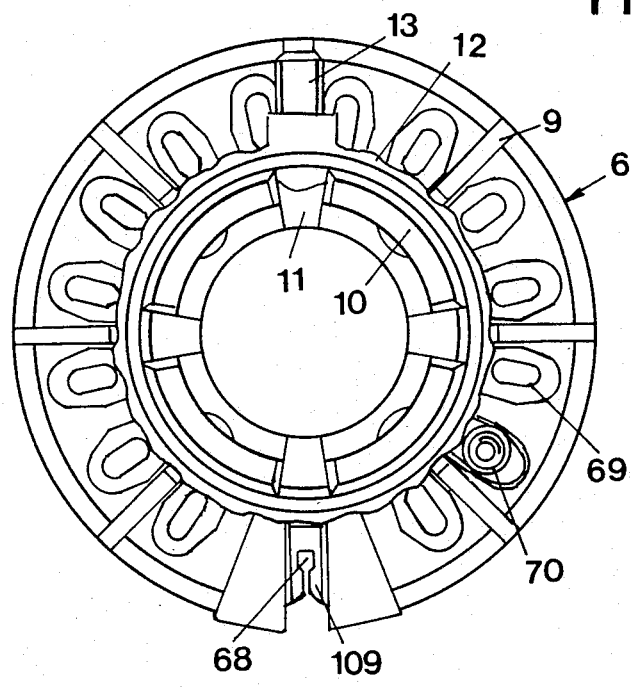
FIG. 5 is an elevation from the left of the FIG. 1 base with slight modifications.

In the base 6 of FIG. 1 as shown in FIG. 5, there is additional provision for locating the capillary tube 65 by means of an axial slot 68 in a radial wall 109. In addition, several apertures 69 are provided at the periphery, into which there can be introduced plug elements 70 cooperating with abutments on the coupling element 51 for limiting rotational movement.

In the construction as described, practically all the elements can be made from plastics material, with the exception of the working element 25, springs 28 and 59, as well as screw 13 and possibly the coupling element 151.

We claim:

1. A thermostatic valve assembly, comprising a base member, a cup shaped knob mounted in rotatable relation and axial fixed relation to said base, said knob having an end wall, an expansible working element having a rigid outer shell with first plate means at one end thereof which frictionally engages said knob end wall, and an axially flexible inner shell with second plate means at one end thereof in adjustable spaced relation to said first plate means, said inner and outer shells forming an interior space for a liquid-vapor filling and said inner shell being a corrugated tube having one end connected to the second plate means and an opposite end connected to the end of the outer shell opposite the first plate means, a coupling member attached to said knob and having a first tube portion nested in said corrugated tube, a setting element connected to said second plate means, spring means biasing said second plate means toward said first plate means, axially movably supporting bearing means for said spring means that includes a second tube portion, said base member having axial guide means for said supporting bearing means, and thread means between said knob and said supporting bearing means to adjust the compression of said spring means upon turning said knob, said thread means being between said first and second tube portions.

2. A thermostatic valve assembly according to claim 1 including guide track means on said supporting bearing means cooperable with said base member guide means.

3. A thermostatic valve assembly according to claim 2 wherein said second tube portion has a slotted body forming plurality of axially extending slots to form first and second guide tracks, said slotted body being formed adjacent said second tracks by the external part of said thread means on said second tube portion, and said slotted body being formed adjacent said first tracks by a supporting ring.

4. A thermostatic valve assembly according to claim 1 wherein said base member axial guide means is formed by ribs, said base member having supporting ring members at opposite ends of said ribs.

5. A thermostatic valve assembly according to claim 1 wherein said thread means includes internal thread means on said coupling member first tube portion.

6. A thermostatic valve assembly according to claim 5 including means connecting said coupling member and said first tube portion.

7. A thermostatic valve assembly, comprising, a base member, a cup shaped knob mounted in rotatable relation to and axially fixed relation to said base, said knob having an end wall, an expansible working element having a rigid outer shell with first plate means at one end thereof which frictionally engages said knob end wall, said working element having an axially flexible inner shell with second plate means at one end thereof in adjustable spaced relation to said first plate means, said inner and outer shells forming an interior space for a liquid-vapor filling, a setting element connected to said second plate means, spring means biasing said second plate means towards said first plate means, axially moveably supporting bearing means for said spring means, thread means between said knob and said supporting bearing means to adjust the compression of said spring means upon turning said knob, a guide cylinder connected to said outer shell and being between said spring means and said supporting bearing means, and guide means between said cylinder and said supporting bearing means.

8. A thermostat attachment for a valve comprising a base adapted for mounting on a valve, a cup shaped knob having an annular wall and an end wall joined to the annular wall, said knob and base having cooperating means for retaining the knob in axial fixed relationship to the base while permitting rotation of the knob relative to the base, an expansible working element within the knob that includes a rigid outer shell that has a first plate at one end thereof that frictionally engages the knob end wall, an axially flexible inner shell having one end connected to the outer shell and an opposite end and a second plate connected to the inner shell opposite end that is axially spaced from the first plate, said shells and second plate forming an interior spaced for a liquid-vapor filling, a setting element connected to said second plate, an axially movable support bearing that is radially spaced from the knob annular wall, spring means bearing against the supporting bearing for biasing said second plate toward the first plate and thread means for connecting the knob to the supporting bearing to adjust the compression of the spring means upon rotating the knob.

9. The apparatus of claim 8 further characterized in that the thread means extends axially into the inner shell.

10. The apparatus of claim 8 further characterized in that the inner shell comprises a corrugated tube and that the above thread means includes an internally threaded member connected to the knob to rotate therewith and external thread means joined to the supporting bearing and threadedly connected to the internally threaded member to move axially relative thereto when the internally threaded member is rotated, the maximum diameters of the threaded member and the last mentioned thread means being smaller than the minimum diameters of the corrugated tube.

11. The apparatus of claim 8 further characterized in that the working element has means for limiting the movement of the second plate axially away from the first plate.

12. The apparatus of claim 8 further characterized in that the thread means includes means for retaining the working element in non-rotatable relationship to the supporting bearing while permitting the second plate to move axially relative to the supporting bearing and retaining the supporting bearing in non-rotatable relationship to the base.

* * * * *